(12) United States Patent
Cheung et al.

(10) Patent No.: US 8,113,048 B2
(45) Date of Patent: Feb. 14, 2012

(54) DYNAMIC IMBALANCE DETECTION APPARATUS AND METHOD USING LINEAR TIME-VARYING ANGULAR VELOCITY MODEL

(75) Inventors: Wan Sup Cheung, Daejeon (KR); Jong Yeon Lim, Daejeon (KR); Sae Won Yoon, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 409 days.

(21) Appl. No.: 12/382,772

(22) Filed: Mar. 24, 2009

(65) Prior Publication Data
US 2009/0249872 A1 Oct. 8, 2009

(30) Foreign Application Priority Data
Mar. 25, 2008 (KR) .................. 10-2008-0027284

(51) Int. Cl.
*G01M 1/16* (2006.01)
*G01M 7/00* (2006.01)
*G01G 3/16* (2006.01)
*G01G 11/00* (2006.01)
*G01G 11/04* (2006.01)
*G01N 29/00* (2006.01)
*G01L 1/00* (2006.01)
*G01L 3/00* (2006.01)
*G01L 5/00* (2006.01)
*G01R 23/16* (2006.01)

(52) U.S. Cl. .................. 73/462; 73/580; 702/41; 702/77
(58) Field of Classification Search .................... 73/462, 73/579, 581, 602
See application file for complete search history.

(56) References Cited

U.S. PATENT DOCUMENTS
7,441,456 B1* 10/2008 Corbin et al. .................. 73/462
7,761,256 B2* 7/2010 Studer et al. .................. 702/145
* cited by examiner

*Primary Examiner* — Lisa Caputo
*Assistant Examiner* — Roger Hernandez-Prewitt
(74) *Attorney, Agent, or Firm* — Clark & Brody

(57) ABSTRACT

Provided is a dynamic balancing apparatus using a linear time-varying angular velocity model, which includes a rotational shaft on which a rotational body having a rotating unbalanced mass is installed; a linear time-varying angular velocity generator which allow the rotational shaft to be rotated at a linear time-varying angular velocity; a support for supporting both sides of the rotational shaft; and a transducer for measuring applied force or vibration transferred to the support by revolution of the rotational shaft having a linear time-varying angular velocity.

8 Claims, 5 Drawing Sheets

DYNAMIC IMBALANCE DETECTION APPARATUS AND METHOD USING LINEAR TIME-VARYING ANGULAR VELOCITY MODEL

TECHNICAL FIELD

The present invention relates to a dynamic balancing apparatus and effective balancing methods using a linear time-varying angular velocity model, which precisely evaluate the angular position and magnitude of an unbalanced mass of a rotational body which is rotated at the linear time-varying angular velocity.

BACKGROUND ART

All components of rotational machines are primarily manufactured along the central rotation axis of dedicated machines thereof. A dynamic balancing apparatus has been used to measure the angular position and magnitude of an unbalanced mass which exits with respect to the actual running axis after the components of the rotational machine are assembled.

A dynamic balancing method is a theoretical method which is used in the dynamic balancing apparatus to measure the angular position and magnitude of the unbalanced mass.

In order to implement the dynamic balancing, most commercially used dynamic balancing apparatuses measure only a centrifugal force component generated by the unbalanced mass when a balancing test piece is rotated at the constant speed, or indirectly measure vibration of a support generated by the centrifugal force, thereby estimating the angular position and magnitude of a rotating unbalanced mass.

The existing balancing apparatus needs an accelerating time until reaching to a certain rotating speed from the stopped state, a real balancing time which is performed at the certain rotating speed and a decelerating time which is necessary to stop the rotating state from the certain rotating speed.

Due to the accelerating time, the real balancing time and the decelerating time, there is a problem that the existing balancing apparatus is limited in productivity, i.e., the number of balancing operations per unit time.

DISCLOSURE OF THE INVENTION

It is an object of the present invention to provide a dynamic balancing apparatus and effective methods using a linear time-varying angular velocity model, which can perform a balancing operation over all time regions of the accelerating time, the constant speed balancing time and the decelerating time which are accompanied with the balancing operation of a rotational body.

It is another object of the present invention to provide a dynamic balancing apparatus and effective methods using a linear time-varying angular velocity model, which remarkably improve the number of balancing operations per unit time.

To solve the above-mentioned objects, the present invention provides a dynamic balancing apparatus using a linear time-varying angular velocity model, including a rotational shaft 10 on which a rotational body 1 having an unbalanced mass is installed; a linear time-varying angular velocity generator 20 which is installed on the rotational shaft and allows the rotational shaft 10 to be rotated at a linear time-varying angular velocity; a support 30 for supporting both sides of the rotational shaft 10; and transducers 40 which is installed on the support and measures applied force or vibration transferred to the support 30 by revolution of the rotational shaft 10 having a linear time-varying angular velocity.

Preferably, the dynamic balancing apparatus further includes a reference pulse generator 50 which generates a reference position pulse of the rotational shaft 10 so as to measure a position of the rotational body 1 with respect to the linear time-varying angular velocity of the rotational shaft 10.

Also, the present invention provides a dynamic balancing method using a linear time-varying angular velocity model, including: rotating a rotational shaft 10, on which a rotational body 1 having a rotating unbalanced mass is installed, at a linear time-varying angular velocity; measuring vibration generated by tangential force, centrifugal force, or the two forces generated by the rotating unbalanced mass of the rotational body 1 from a support 30 which supports the rotational shaft 10 rotated at the linear time-varying angular velocity; estimating frequency components of a measurement signal corresponding to the measured tangential and centrifugal forces; and estimating the angular position and the magnitude of the unbalanced mass of the rotational body 1 using components of the measured normal force and centrifugal forces and characteristics of the Fourier coefficients of the two forces.

Preferably, the angular position and magnitude of the unbalanced mass of the rotational body 1 is determined by the following equations:

$$F_X(\theta(t)) = -F_t \cdot \sin(\theta(t) + \theta_0) + F_n \cdot \cos(\theta(t) + \theta_0)$$
$$= mr \cdot b \cdot \sin(\theta(t) + \theta_0) + mr \cdot \{a^2 + 2b \cdot \theta(t)\} \cdot \cos(\theta(t) + \theta_0)$$
$$= mr \cdot b \cdot \{\cos(\theta_0) \cdot \sin(\theta(t)) + \sin(\theta_0) \cdot \cos(\theta(t))\} +$$
$$mr \cdot a^2 \cdot \{\cos(\theta_0) \cdot \cos(\theta(t)) - \sin(\theta_0) \cdot \sin(\theta)\} +$$
$$mr \cdot 2b \cdot \{\cos(\theta_0) \cdot \theta(t) \cdot \cos(\theta(t)) - \sin(\theta_0) \cdot \theta(t) \cdot \sin(\theta(t))\}$$

$$F_Y(\theta(t)) = F_t \cdot \cos(\theta(t) + \theta_0) + F_n \cdot \sin(\theta(t) + \theta_0) -$$
$$= mr \cdot b \cdot \cos(\theta(t) + \theta_0) + mr \cdot \{a^2 + 2b \cdot \theta(t)\} \cdot \sin(\theta(t) + \theta_0) -$$
$$= mr \cdot b \cdot \{\cos(\theta_0) \cdot \cos(\theta(t)) - \sin(\theta_0) \cdot \sin(\theta(t))\} +$$
$$mr \cdot a^2 \cdot \{\cos(\theta_0) \cdot \sin(\theta(t)) + \sin(\theta_0) \cdot \cos(\theta)\} +$$
$$mr \cdot 2b \cdot \{\cos(\theta_0) \cdot \theta(t) \cdot \sin(\theta(t)) + \sin(\theta_0) \cdot \theta(t) \cdot \cos(\theta(t))\}$$

wherein $F_x(t)$ is the horizontal component of each of the tangential force $F_t$ and the centrifugal force $F_n$ generated at the support 30 by the rotating unbalanced mass of the rotational body 1; $F_y(t)$ is the vertical component of each of the tangential force $F_t$ and the centrifugal force $F_n$ generated at the support 30 by the rotating unbalanced mass of the rotational body 1; m[kg] is the rotating unbalanced mass of the rotational body; r[m] is the distance of the rotating unbalanced mass of the rotational body, which is spaced apart from the center of rotational shaft 10; a[radians/s] is an initial rotational velocity; b[radians/s$^2$] is a constant angular acceleration at the initial rotational velocity; $\theta(t)$ is the angular displacement of the rotational shaft; and $\theta_0$[radians] is an angle from a rotation reference point of the rotational shaft.

Preferably, an unbalanced amount (m·r) due to the rotating unbalanced mass of the rotational body 1 is determined by the following equation using the tangential force and the centrifugal force, which are measured from the support and acting in the horizontal and vertical directions, $$\begin{bmatrix} C_{F_X}(k) \\ S_{F_X}(k) \\ C_{F_Y}(k) \\ S_{F_Y}(k) \end{bmatrix} = \begin{bmatrix} 0 & -2b \cdot S_{C,\theta}(k) \\ 2b \cdot C_{S,\theta}(k) & 0 \\ 2b \cdot S_{C,\theta}(k) & 0 \\ 0 & 2b \cdot C_{S,\theta}(k) \end{bmatrix} \begin{bmatrix} U_{cos} \\ U_{sin} \end{bmatrix},$$

for $k = 1, 2, 3\ldots$ wherein $C_{Fx}$ is cosine components corresponding to Fourier coefficients of the horizontal components of the tangential and centrifugal forces acting on the support 30 by the rotating unbalanced mass of the rotational body 1, and $S_{Fx}$ is sine components corresponding to Fourier coefficients of the horizontal components of the tangential and centrifugal forces acting on the support 30 by the rotating unbalanced mass of the rotational body 1, and these components are determined by the following equation:

$$C_{F_X}(k) = \frac{1}{2\pi} \int_0^{2\pi} \cos(k \cdot \theta) \cdot F_X(\theta) \, d\theta,$$

$$S_{F_X}(k) = \frac{1}{2\pi} \int_0^{2\pi} \sin(k \cdot \theta) \cdot F_X(\theta) \, d\theta$$

and k is an integer indicating the order of Fourier coefficients, $C_{Fy}$ is the cosine components corresponding to Fourier coefficients of the vertical components of the tangential and centrifugal forces generated at the support 30 by the rotating unbalanced mass of the rotational body 1, and $S_{Fy}$ is the sine components corresponding to Fourier coefficients of the vertical components of the tangential and centrifugal forces generated at the support 30 by the rotating unbalanced mass of the rotational body 1, and these components are determined by the following equation:

$$C_{F_Y}(k) = \frac{1}{2\pi} \int_0^{2\pi} \cos(k \cdot \theta) \cdot F_Y(\theta) \, d\theta,$$

$$S_{F_Y}(k) = \frac{1}{2\pi} \int_0^{2\pi} \sin(k \cdot \theta) \cdot F_Y(\theta) \, d\theta$$

and $U_{cos}$ is the cosine component of the unbalanced amount ($U_{cos} = mr \cdot \cos(\theta_0)$) and $U_{sin}$ is the sine component of the unbalanced amount ($U_{sin} = mr \cdot \sin(\theta_0)$), $$C_{c,\theta}(k) = \frac{1}{2\pi} \int_0^{2\pi} \cos(k \cdot \theta) \cdot \theta \cdot \cos(\theta) \, d\theta = \frac{\pi}{2}, \quad \text{only for } k = 1$$

$$S_{s,\theta}(k) = \frac{1}{2\pi} \int_0^{2\pi} \sin(k \cdot \theta) \cdot \theta \cdot \sin(\theta) \, d\theta = \frac{\pi}{2}, \quad \text{only for } k = 1$$

$$C_{s,\theta}(k) = \frac{1}{2\pi} \int_0^{2\pi} \sin(k \cdot \theta) \cdot \theta \cdot \cos(\theta) \, d\theta = \begin{cases} 1/4, & \text{for } k = 1 \\ -\frac{k}{k^2 - 1}, & \text{for } k = 2, 3, \ldots \end{cases}$$

$$S_{c,\theta}(k) = \frac{1}{2\pi} \int_0^{2\pi} \cos(k \cdot \theta) \cdot \theta \cdot \sin(\theta) \, d\theta = \begin{cases} 3k/4 - 1, & \text{for } k = 0, 1 \\ \frac{1}{k^2 - 1}, & \text{for } k = 2, 3, \ldots \end{cases}$$

Preferably, a sampling method of measurement signals is chosen to measure applied force signals on the support using a reference pulse generator or a rotary encoder which generates angular position pulses having a constant width (or equi-angle revolution) whenever the rotational shaft is rotated.

DETAILED DESCRIPTION OF MAIN ELEMENTS

1: rotational body  
10: rotational shaft  
20: linear time-varying angular velocity generator  
30: support  
40: transducer  
50: reference pulse generator or encoder

BEST MODES FOR CARRYING OUT THE INVENTION

Practical and presently preferred embodiments of the present invention are illustrative as shown in the following embodiment.

However, it will be appreciated that those skilled in the art, on consideration of this disclosure, may make modifications and improvements within the spirit and scope of the present invention.

Figure 1A:
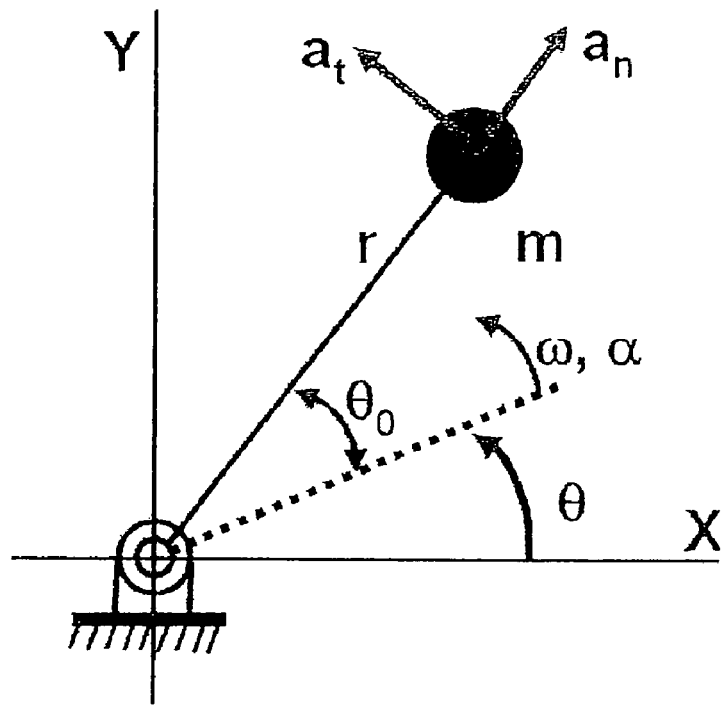
FIGS. 1A and 1B are views showing components of applied forces exerted to the support and acceleration components of an unbalanced mass.
Figure 1B:
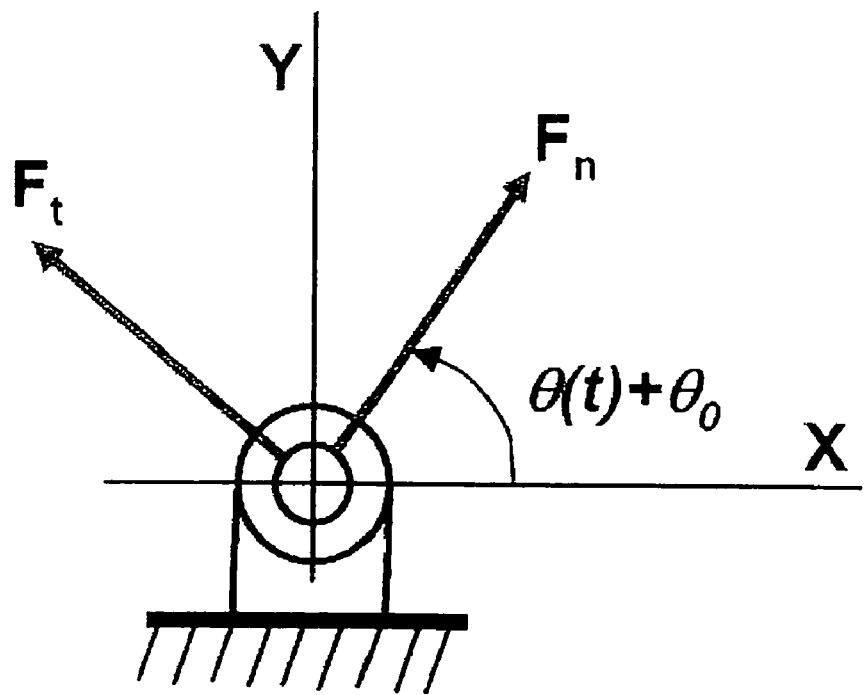
Figure 2:
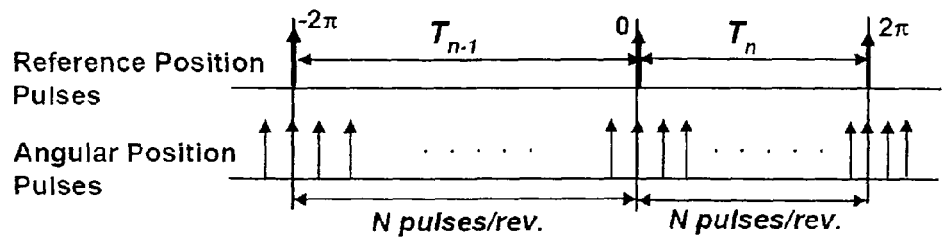
FIGS. 2 to 4 are views showing signal sampling methods using a rotary encoder or a reference pulse generator.
Figure 3:
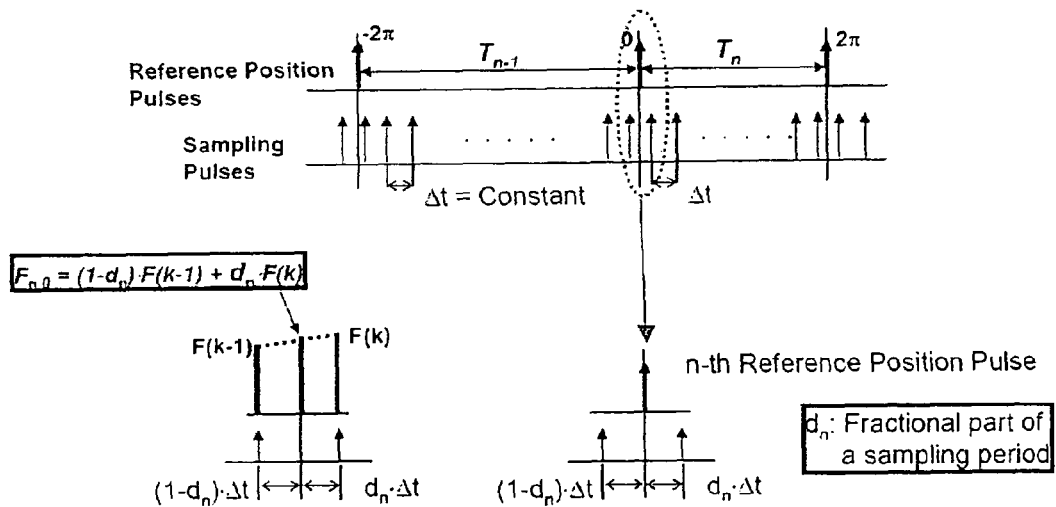
Figure 4:
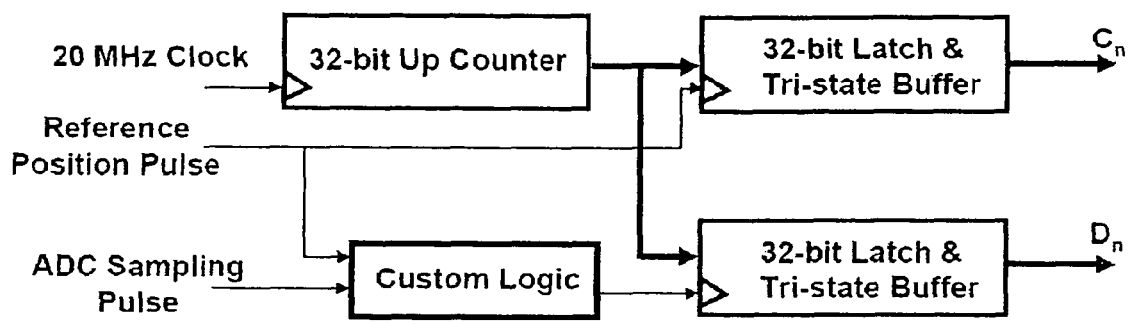
Figure 5A:
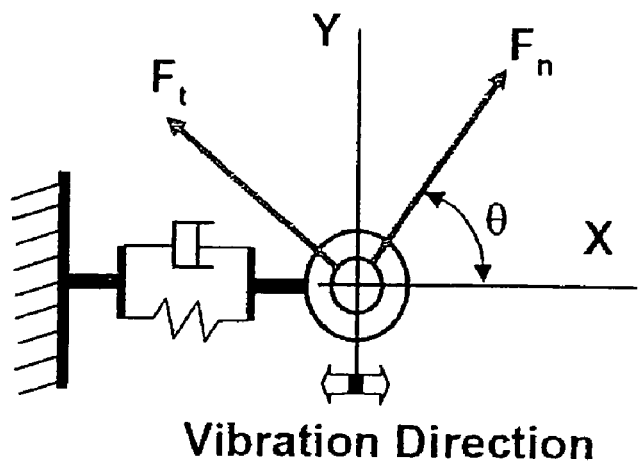
FIGS. 5A, 5B and 5C are views showing vibration models of the support.
Figure 5B:
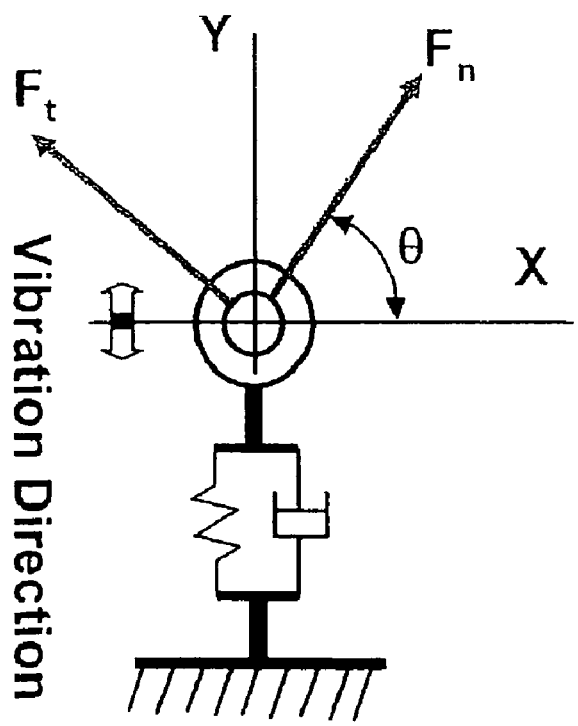
Figure 5C:
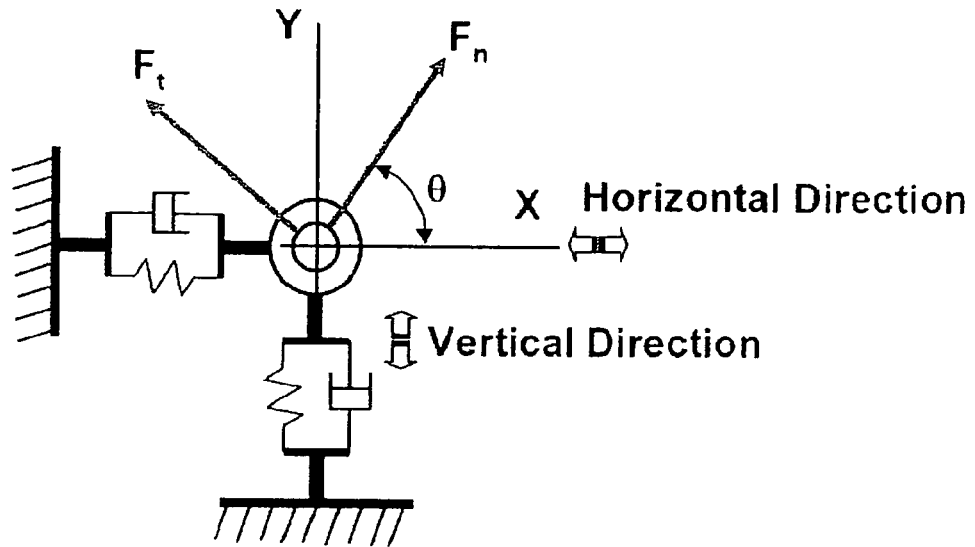
Figure 6:
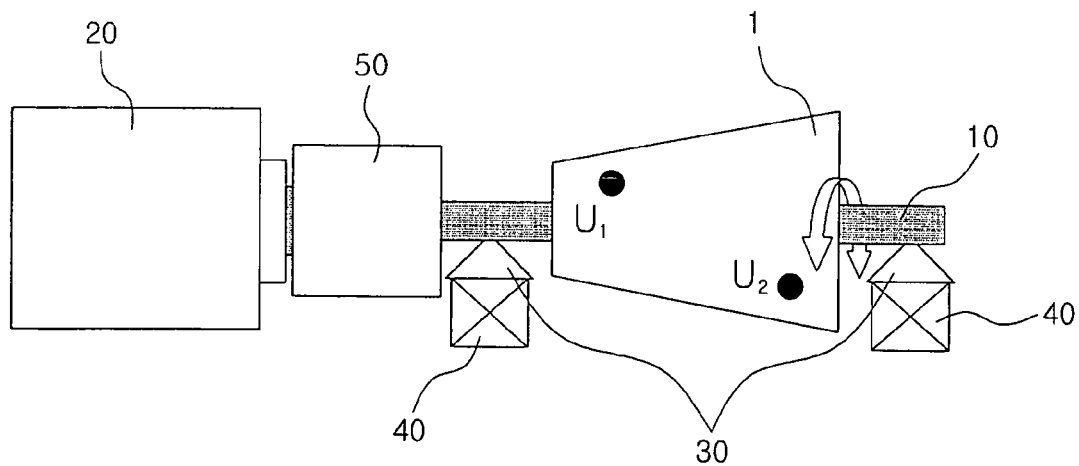
FIG. 6 is a schematic view showing the configuration of a dynamic balancing apparatus using a linear time-varying angular velocity model in accordance with an embodiment of the present invention.

FIGS. 1A and 1B are views showing components of applied forces exerted to the support and acceleration components of an unbalanced mass, and FIGS. 2 to 4 are views showing signal sampling methods using a rotary encoder or a reference pulse generator. FIGS. 5A, 5B and 5C are views showing vibration models of the support and FIG. 6 is a schematic view showing the configuration of a dynamic balancing apparatus using a linear time-varying angular velocity model.

If a rotational body is rotated at an initial rotational velocity a [radians/s] and a constant angular velocity b [radians/s²] while passing an angular reference point at a time, an angular displacement θ(t) of a rotational shaft, an angular velocity ω(t) and an angular acceleration α(t) can be expressed by the following equations.

$$\theta(t) = a \cdot t + 0.5 \cdot b \cdot t^2,$$

$$\omega(t) = d\theta(t)/dt = a + b \cdot t,$$

$$\alpha(t) = d^2\theta(t)/dt^2 = b \quad \text{Eq. 1}$$

As expressed in the equation 1, when the angular acceleration b is constant, the angular velocity ω has a linear relationship with a time. A method of realizing the balancing of the rotational body under the rotational motion, i.e., the linear time-varying angular velocity, is as follows.

As shown in FIG. 1A, mass m[kg] spaced by a distance r[m] from a rotational shaft and positioned at the angle $\theta_0$[radians] from an angular reference point (a dot line illustrated in FIG. 1A) is moved at an acceleration $a_t(t)$ in a tangential direction and an acceleration $a_n(t)$ in a normal direction. As shown in FIG. 1B, these two acceleration components act as repulsive force such as tangential force $F_t(t)$ and centrifugal force $F_n(t)$ with respect to a support, respectively.

$$F_t(t) = -m \cdot a_t(t) = -mr \cdot \alpha(t) = -mr \cdot b,$$

$$F_n(t) = -m \cdot a_n(t) = mr \cdot \omega^2(t) = mr \cdot \{a^2 + 2b \cdot \theta(t)\} \quad \text{Eq. 2}$$

Explaining the numerical marks $-m \cdot a_n(t) mr \cdot \omega^2(t)$ of $F_n(t) = -m \cdot a_n(t) = mr \cdot \omega^2(t)$ with reference to the vector direction defined in FIG. 1A), since the centrifugal force $F_n(t)$ and the acceleration $a_n(t)$ direction act in the opposite direction, it is expressed in a Scalar expression using an negative (−) mark. In the coordinate system shown in FIG. 1A), the vector direction of the angular displacement, the angular velocity, and the angular acceleration describing the rotational movement of the mass m[kg] on the XY place should have only a component of the Z-axis direction. the vector direction of the angular displacement the angular velocity and the angular acceleration describing the rotational movement of the mass m[kg] on the XY plane should have only a component of the Z-axis direction. When the angular displacement, the angular velocity, and the angular acceleration have positive (+) values in a counterclockwise direction, they are directed to a positive (+) Z direction, and when the angular displacement, the angular velocity, and the angular acceleration have negative (−) values in a clockwise direction, they are directed to a negative (−) Z direction. With the angular kinematics, it should be appreciated that the angular displacement, the angular velocity, and the angular acceleration have directivity, and the rotation body has a perpendicular direction to a rotation surface around which it moves. In two dimensions, the Scalar expression $a_n r \omega^2$ is sufficient, whereas, in three dimensions, a vector expression is further required. The angular velocity, which is the vector, is in parallel with the rotational shaft. As described above, the angular velocity in FIG. 1A) is directed to a direction perpendicular to a ground. A direction to be rotated is determined by the Right Hand Rule. The direction of the angular velocity is the direction of the thumb when right hand fingers hold the rotational shaft along the arc of the circumference of the rotational shaft in a direction that the mass m[kg] is rotated and the thumb is raised to be perpendicular to other fingers.

When a velocity of the rotational shaft is increased at a constant angular acceleration, it can be understood that the tangential force is proportional to a magnitude of the angular acceleration and the centrifugal force is proportional to the sum of the square of initial angular velocity plus the angular acceleration multiplied by the angular displacement. The tangential force and the centrifugal force are respectively divided into a horizontal component $F_X(t)$ and a vertical component $F_Y(t)$ and then expressed as follows.

$$\begin{aligned} F_X(\theta(t)) &= -F_t \cdot \sin(\theta(t) + \theta_0) + F_n \cdot \cos(\theta(t) + \theta_0) \quad \text{Eq. 3} \\ &= mr \cdot b \cdot \sin(\theta(t) + \theta_0) + \\ &\quad mr \cdot \{a^2 + 2b \cdot \theta(t)\} \cdot \cos(\theta(t) + \theta_0) \\ &= mr \cdot b \cdot \{\cos(\theta_0) \cdot \sin(\theta(t)) + \sin(\theta_0) \cdot \cos(\theta(t))\} + \\ &\quad mr \cdot a^2 \cdot \{\cos(\theta_0) \cdot \cos(\theta(t)) - \sin(\theta_0) \cdot \sin(\theta(t))\} + \\ &\quad mr \cdot 2b \cdot \{\cos(\theta_0) \cdot \theta(t) \cdot \\ &\quad \cos(\theta(t)) - \sin(\theta_0) \cdot \theta(t) \cdot \sin(\theta(t))\} \end{aligned}$$

-continued $$\begin{aligned} F_Y(\theta(t)) &= F_t \cdot \cos(\theta(t) + \theta_0) + F_n \cdot \sin(\theta(t) + \theta_0) \quad \text{Eq. 4} \\ &= -mr \cdot b \cdot \cos(\theta(t) + \theta_0) + \\ &\quad mr \cdot \{a^2 + 2b \cdot \theta(t)\} \cdot \sin(\theta(t) + \theta_0) \\ &= -mr \cdot b \cdot \{\cos(\theta_0) \cdot \cos(\theta(t)) - \sin(\theta_0) \cdot \sin(\theta(t))\} + \\ &\quad mr \cdot a^2 \cdot \{\cos(\theta_0) \cdot \sin(\theta(t)) + \sin(\theta_0) \cdot \cos(\theta(t))\} + \\ &\quad mr \cdot 2b \cdot \{\cos(\theta_0) \cdot \theta(t) \cdot \sin(\theta(t)) + \\ &\quad \sin(\theta_0) \cdot \theta(t) \cdot \cos(\theta(t))\} \end{aligned}$$

As described above, it can be understood that these horizontal and vertical forces are changed according to an unbalanced amount (mr: an amount defined as a multiplication of a mass and a radius) and an angular position $\theta_0$. This fact means a method of estimating the unbalanced amount and the angular position from components of the forces applied to the support 30 using an angular velocity motion which is linearly varied with respect to time, i.e., a new principle of balancing method. The balancing method of the present invention uses the components of tangential and centrifugal forces all together, and also uses characteristics of a periodic function of the two forces, i.e., characteristics of frequency components in estimating the unbalanced amount and the angular position. In other words, the applied forces having the horizontal and vertical components is comprised of a combination of the periodic functions $\cos(\theta(t))$, $\sin(\theta(t))$, $\theta(t) \times \cos(\theta(t))$ and $\theta(t) \times \sin(\theta(t))$ of the rotational angle. The periodic functions are expressed by Fourier coefficients showing the mathematical relationships of the periodic functions as follows.

$$C_c(k) = \frac{1}{2\pi} \int_0^{2\pi} \cos(k \cdot \theta) \cdot \cos(\theta) d\theta = \frac{1}{2}, \text{ only for } k = 1 \quad \text{Eq. 5}$$

$$S_s(k) = \frac{1}{2\pi} \int_0^{2\pi} \sin(k \cdot \theta) \cdot \sin(\theta) d\theta = \frac{1}{2}, \text{ only for } k = 1$$

$$C_{c,\theta}(k) = \frac{1}{2\pi} \int_0^{2\pi} \cos(k \cdot \theta) \cdot \theta \cdot \cos(\theta) d\theta = \frac{\pi}{2}, \text{ only for } k = 1$$

$$S_{s,\theta}(k) = \frac{1}{2\pi} \int_0^{2\pi} \sin(k \cdot \theta) \cdot \theta \cdot \sin(\theta) d\theta = \frac{\pi}{2}, \text{ only for } k = 1$$

$$C_{s,\theta}(k) = \frac{1}{2\pi} \int_0^{2\pi} \sin(k \cdot \theta) \cdot \theta \cdot \cos(\theta) d\theta = \begin{cases} -1/4, & \text{for } k = 1 \\ -\dfrac{k}{k^2 - 1}, & \text{for } k = 2, 3, \ldots \end{cases}$$

$$S_{c,\theta}(k) = \frac{1}{2\pi} \int_0^{2\pi} \cos(k \cdot \theta) \cdot \theta \cdot \sin(\theta) d\theta = \begin{cases} 3k/4 - 1, & \text{for } k = 0, 1 \\ \dfrac{1}{k^2 - 1}, & \text{for } k = 2, 3, \ldots \end{cases}$$

Therefore, it can be understood that resultant values obtained by integrating the components of the horizontal and vertical forces measured upon every revolution of the rotational shaft can be expressed by a combination of the above-described Fourier coefficients.

First of all, a cosine component $C_{Fx}$ and a sine component $S_{Fx}$ corresponding to the Fourier coefficients of the horizontal force are as follows.

$$C_{Fx}(k) = \frac{1}{2\pi} \int_0^{2\pi} \cos(k \cdot \theta) \cdot F_X(\theta) d\theta, \quad \text{Eq. 6}$$

$$S_{F_X}(k) = \frac{1}{2\pi}\int_0^{2\pi} \sin(k\cdot\theta)\cdot F_X(\theta)\,d\theta$$

In the equation, k is an integer indicating an order of the Fourier coefficients.

A cosine component $C_{F_y}$ and a sine component $S_{F_y}$ corresponding to the Fourier coefficients of the vertical force are as follows:

$$C_{F_Y}(k) = \frac{1}{2\pi}\int_0^{2\pi} \cos(k\cdot\theta)\cdot F_Y(\theta)\,d\theta, \quad \text{Eq. 7}$$

$$S_{F_Y}(k) = \frac{1}{2\pi}\int_0^{2\pi} \sin(k\cdot\theta)\cdot F_Y(\theta)\,d\theta$$

In case of k=0, that is, a mean value of the horizontal and vertical force components, while the rotational shaft is rotated once, is as follow.

$$C_{F_X}(0) = \frac{1}{2\pi}\int_0^{2\pi} F_X(\theta(t))\,d\theta \quad \text{Eq. 8}$$
$$= -mr\cdot 2b\cdot S_{C,\theta}(0)\cdot \sin(\theta_0)$$
$$= mr\cdot 2b\cdot \sin(\theta_0)$$

$$C_{F_Y}(0) = \frac{1}{2\pi}\int_0^{2\pi} F_Y(\theta(t))\,d\theta$$
$$= mr\cdot 2b\cdot S_{C,\theta}(0)\cdot \cos(\theta_0)$$
$$= -mr\cdot 2b\cdot \cos(\theta_0)$$

$$S_{F_X}(0) = S_{F_Y}(0) = 0$$

Therefore, it is possible to estimate the angular position and magnitude of the unbalanced mass from the mean value of the horizontal and vertical forces at each revolution of the rotational shaft. A cosine component $U_{cos}=mr\cdot\cos(\theta_0)$ and a sine component $U_{sin}=mr\cdot\sin(\theta_0)$ of the unbalanced amount mr are obtained by the following equation using an acceleration value b at each revolution. From the cosine and sine components of the unbalanced amount, the magnitude and angular position of the unbalanced mass can be finally expressed as follows.

$$mr\cdot\cos(\theta_0) = -C_{F_Y}(0)/2b, \quad \text{Eq. 9}$$

$$mr\cdot\sin(\theta_0) = C_{F_X}(0)/2b$$

$$mr = \frac{1}{2b}\sqrt{C_{F_X}(0)^2 + C_{F_Y}(0)^2},$$

$$\theta_0 = \tan^{-1}\left(\frac{C_{F_X}(0)}{-C_{F_Y}(0)}\right)$$

In case of the same order as the number of revolutions, i.e., k=1, values corresponding to the cosine and sine components of the horizontal and vertical forces are expressed by the following equations.

$$C_{F_X}(1) = \frac{1}{2\pi}\int_0^{2\pi} \cos(\theta)\cdot F_X(\theta)\,d\theta \quad \text{Eq. 10}$$
$$= mr\cdot b\cdot C_C(1)\cdot \sin(\theta_0) +$$
$$mr\cdot a^2\cdot C_C(1)\cdot \cos(\theta_0) +$$
$$mr\cdot 2b\cdot C_{C,\theta}(1)\cdot \cos(\theta_0) -$$
$$mr\cdot 2b\cdot S_{C,\theta}(1)\cdot \sin(\theta_0)$$

$$S_{F_X}(1) = \frac{1}{2\pi}\int_0^{2\pi} \sin(\theta)\cdot F_X(\theta)\,d\theta$$
$$= mr\cdot b\cdot S_S(1)\cdot \cos(\theta_0) - mr\cdot a^2\cdot S_S(1)\cdot \sin(\theta_0) +$$
$$mr\cdot 2b\cdot C_{S,\theta}(1)\cdot \cos(\theta_0) -$$
$$mr\cdot 2b\cdot S_{S,\theta}(1)\cdot \sin(\theta_0)$$

$$C_{F_Y}(1) = \frac{1}{2\pi}\int_0^{2\pi} \cos(\theta)\cdot F_Y(\theta)\,d\theta$$
$$= -mr\cdot b\cdot C_C(1)\cdot \cos(\theta_0) +$$
$$mr\cdot a^2\cdot C_C(1)\cdot \sin(\theta_0) +$$
$$mr\cdot 2b\cdot S_{C,\theta}(1)\cdot \cos(\theta_0) +$$
$$mr\cdot 2b\cdot C_{C,\theta}(1)\cdot \sin(\theta_0)$$

$$S_{F_Y}(1) = \frac{1}{2\pi}\int_0^{2\pi} \sin(\theta)\cdot F_Y(\theta)\,d\theta$$
$$= mr\cdot b\cdot S_S(1)\cdot \sin(\theta_0) + mr\cdot a^2\cdot S_S(1)\cdot \cos(\theta_0) +$$
$$mr\cdot 2b\cdot S_{S,\theta}(1)\cdot \cos(\theta_0) +$$
$$mr\cdot 2b\cdot C_{S,\theta}(1)\cdot \sin(\theta_0)$$

In the above equations, the Fourier coefficients which were presented in the equation 5 are as follows.

$$C_{C,\theta}(1) = S_{S,\theta}(1) = \frac{\pi}{2}, \quad \text{Eq. 11}$$

$$S_{C,\theta}(1) = C_{S,\theta}(1) = -\frac{1}{4},$$

$$C_C(1) = S_S(1) = \frac{1}{2}$$

Therefore, using the cosine and sine components of the vertical and horizontal forces corresponding to the first-order term of the rotational angle, the cosine component $U_{cos}=mr\cdot\cos(\theta_0)$ and the sine component $U_{sin}=mr\cdot\sin(\theta_0)$ of the unbalanced amount can be expressed by the following equation:

$$\begin{bmatrix} C_{F_x}(1) \\ S_{F_x}(1) \\ C_{F_y}(1) \\ S_{F_y}(1) \end{bmatrix} = \quad \text{Eq. 12}$$

$$\begin{bmatrix} a^2\cdot C_C(1) + 2b\cdot C_{C,\theta}(1) & b\cdot C_C(1) - 2b\cdot S_{C,\theta}(1) \\ b\cdot S_S(1) + 2b\cdot C_{S,\theta}(1) & -a^2\cdot S_S(1) - 2b\cdot S_{S,\theta}(1) \\ -b\cdot C_C(1) + 2b\cdot S_{C,\theta}(1) & a^2\cdot C_C(1) + 2b\cdot C_{C,\theta}(1) \\ a^2\cdot S_S(1) + 2b\cdot S_{S,\theta}(1) & b\cdot S_S(1) + 2b\cdot C_{S,\theta}(1) \end{bmatrix} \begin{bmatrix} U_{cos} \\ U_{sin} \end{bmatrix}$$

Since an initial angular velocity a and an angular acceleration b are estimated upon every revolution, the angular position $\theta_0$ and the unbalanced amount mr are estimated from the four kinds of force components measured from the support. If two kinds of horizontal components or two kinds of vertical components, or one horizontal component or one vertical component are measured, the balancing is realized. This is obvious that the two unknown quantities, i.e., the cosine and sine components of the unbalanced amount are calculated by only two kinds of measured force components. The conventional balancing method which is performed under the condition of a constant rotating speed is corresponding to a specific case that the angular acceleration is zero, i.e., b=0. Therefore, it can be understood that the balancing method using a linear angular velocity, i.e., a linear time-varying angular velocity model is a further improved method comparing to the conventional method.

In case of higher orders than the number of revolutions, i.e., k≧2, the cosine and sine components of the horizontal and vertical force can be expressed by the follow equations.

$$C_{F_X}(k) = \frac{1}{2\pi}\int_0^{2\pi} \cos(k\cdot\theta)\cdot F_X(\theta)d\theta \qquad \text{Eq. 13}$$
$$= mr\cdot 2b\cdot C_{C,\theta}(k)\cdot\cos(\theta_0) -$$
$$mr\cdot 2b\cdot S_{C,\theta}(k)\cdot\sin(\theta_0)$$
$$= -mr\cdot 2b\cdot S_{C,\theta}(k)\cdot\sin(\theta_0)$$

$$S_{F_X}(k) = \frac{1}{2\pi}\int_0^{2\pi} \sin(k\cdot\theta)\cdot F_X(\theta)d\theta$$
$$= +mr\cdot 2b\cdot C_{S,\theta}(k)\cdot\cos(\theta_0) -$$
$$mr\cdot 2b\cdot S_{S,\theta}(k)\cdot\sin(\theta_0)$$
$$= mr\cdot 2b\cdot C_{S,\theta}(k)\cdot\cos(\theta_0)$$

$$C_{F_Y}(k) = \frac{1}{2\pi}\int_0^{2\pi} \cos(k\cdot\theta)\cdot F_Y(\theta)d\theta$$
$$= mr\cdot 2b\cdot S_{C,\theta}(k)\cdot\cos(\theta_0) +$$
$$mr\cdot 2b\cdot C_{C,\theta}(k)\cdot\sin(\theta_0)$$
$$= mr\cdot 2b\cdot S_{C,\theta}(k)\cdot\cos(\theta_0)$$

$$S_{F_Y}(k) = \frac{1}{2\pi}\int_0^{2\pi} \sin(k\cdot\theta)\cdot F_Y(\theta)d\theta$$
$$= mr\cdot 2b\cdot S_{S,\theta}(k)\cdot\cos(\theta_0) +$$
$$mr\cdot 2b\cdot C_{S,\theta}(k)\cdot\sin(\theta_0)$$
$$= mr\cdot 2b\cdot C_{S,\theta}(k)\cdot\sin(\theta_0)$$

Like in the equation 5, the values related to the Fourier coefficients are as follows.

$$C_{C,\theta}(k) = S_{S,\theta}(k) = 0, \text{ for } k = 2, 3, \ldots \qquad \text{Eq. 14}$$
$$S_{C,\theta}(k) = \frac{1}{k^2-1},\ C_{S,\theta}(k) = \frac{-k}{k^2-1}$$

Therefore, using the cosine and sine components of the vertical and horizontal forces corresponding to higher order terms than the first one of the rotational angle, the cosine component $U_{cos}=mr\cdot\cos(\theta_0)$ and the sine component $U_{sin}=mr\cdot\sin(\theta_0)$ of the unbalanced amount can be expressed by the following equation.

$$\begin{bmatrix} C_{F_x}(k) \\ S_{F_x}(k) \\ C_{F_y}(k) \\ S_{F_y}(k) \end{bmatrix} = \begin{bmatrix} 0 & -2b\cdot S_{C,\theta}(0) \\ 2b\cdot C_{S,\theta}(k) & 0 \\ 2b\cdot S_{C,\theta}(2) & 0 \\ 0 & 2b\cdot C_{S,\theta}(k) \end{bmatrix} \begin{bmatrix} U_{cos} \\ U_{sin} \end{bmatrix}, \qquad \text{Eq. 15}$$

for $k = 1, 2, 3\ldots$

Since the angular acceleration b is estimated upon every revolution, the position $\theta_0$ and the unbalanced amount mr are estimated from only two components of the four kinds of force components measured at the support. In other words, if two kinds of horizontal components or two kinds of vertical components, or one horizontal component or one vertical component are measured, the balancing is realized. However, since the conventional balancing method which is performed under the condition of a constant rotating speed is corresponding to the case that the angular acceleration is zero, i.e., b=0, it is not possible to realize the balancing using the cosine and sine components of the horizontal and vertical forces which is corresponding to a second or more-order terms. Therefore, it can be understood that the balancing method using a linear angular velocity, i.e., a linear time-varying angular velocity model is a further improved method comparing to the conventional method.

Optimal Method of Estimating Angle and Magnitude of Unbalanced Mass

Until now, the balancing method using only each separated-order of the zeroth, first and second or more-orders with respect to the rotational angle is described.

Other method of estimating the position $\theta_0$ and the unbalanced amount mr using various-orders with respect to the rotational angle, i.e., k=0, 1, 2, . . . , is described below.

The cosine and sine components of the horizontal and vertical forces measured at the support, and the cosine component $U_{cos}=mr\cdot\cos(\theta_0)$ and the sine component $U_{sin}=mr\cdot\sin(\theta_0)$ of the unbalanced amount mr can be expressed by the following equation.

$$\begin{bmatrix} C_{F_X}(0) \\ C_{F_Y}(0) \\ C_{F_X}(1) \\ S_{F_X}(1) \\ C_{F_Y}(1) \\ S_{F_Y}(1) \\ C_{F_X}(2) \\ S_{F_X}(2) \\ C_{F_Y}(2) \\ S_{F_Y}(1) \\ \square \\ \square \end{bmatrix} = \qquad \text{Eq. 16}$$

-continued $$\begin{bmatrix} 0 & -2b \cdot S_{C,\theta}(0) \\ +2b \cdot S_{C,\theta}(0) & 0 \\ a^2 \cdot C_C(1) + 2b \cdot C_{C,\theta}(1) & b \cdot C_C(1) - 2b \cdot S_{C,\theta}(1) \\ b \cdot S_S(1) + 2b \cdot C_{S,\theta}(1) & -a^2 \cdot S_S(1) - 2b \cdot S_{S,\theta}(1) \\ -b \cdot C_C(1) + 2b \cdot S_{C,\theta}(1) & a^2 \cdot C_C(1) + 2b \cdot C_{C,\theta}(1) \\ a^2 \cdot S_S(1) + 2b \cdot S_{S,\theta}(1) & b \cdot S_S(1) + 2b \cdot C_{S,\theta}(1) \\ 0 & -2b \cdot S_{C,\theta}(2) \\ 2b \cdot C_{S,\theta}(2) & 0 \\ 2b \cdot S_{S,\theta}(2) & 0 \\ 0 & 2b \cdot C_{S,\theta}() \\ \square & \square \\ \square & \square \end{bmatrix} \begin{bmatrix} U_{cos} \\ U_{sin} \end{bmatrix}$$

The left member of the equation indicates cosine and sine items by orders of the Fourier coefficients of the horizontal and vertical forces applied to the support. An unbalanced vector of the right member, which has the size of 2-by-1, indicates the cosine and sine components of the unbalanced amount and can be expressed as follows.

$$U_{cos} = U \cdot \cos(\theta_0) = mr \cdot \cos(\theta_0),$$  Eq. 17

$$U_{sin} = U \cdot \sin(\theta_0) = mr \cdot \sin(\theta_0)$$

In the equation 10, assuming that the magnitude of left vector $V_F$ is L-by-1, the right matrix M has the size of L-by-2 and can be expressed by the following matrix.

$$V_F = M \cdot \begin{bmatrix} U_{cos} \\ U_{sin} \end{bmatrix}$$  Eq. 18

The matrix of the equation 18 represents a linear relationship between each order component of the Fourier coefficients of the horizontal and vertical forces measured at the support 30 and the two unknown quantities, i.e., the cosine and sine components of the unbalanced amount. From a plurality of measured values having the linear relationship, the two unknown optimal quantities are determined by the least squares method. The following equation which is expressed by a determinant is to calculate the two unknown optimal quantities.

$$\begin{bmatrix} U_{cos} \\ U_{sin} \end{bmatrix} = M^+ \cdot V_F$$  Eq. 19

In the equation 19, $M^+$ indicates a pseudo inverse matrix for the matrix M. The calculation of the pseudo inverse matrix is readily performed according to the numerical method well-known in linear algebra. The unbalanced amount and the angular position are optimally estimated from the cosine and sine components of the unbalanced mass obtained by the series of calculations, as follows.

$$U = mr = \sqrt{U_{cos}^2 + U_{sin}^2}, \quad \theta_0 = \tan^{-1}\left(\frac{U_{sin}}{U_{cos}}\right)$$  Eq. 20

The above result is an optimal method of estimating the unbalanced amount and the angular position by measuring the components of the horizontal and vertical forces applied to the support. Most of the balancing apparatuses used on the ground estimate the unbalanced amount and the angular position by measuring only one component corresponding to the horizontal and vertical forces. To estimate the unbalanced amount and the angular position using only one of the horizontal and vertical forces, the values corresponding to the non-measured terms in the general equation are substituted by zero, or the terms are eliminated, and then the least square method or the above-mentioned determinant is performed or calculated. The following equation indicates the case that only the horizontal force component is measured.

$$\begin{bmatrix} C_{F_X}(0) \\ C_{F_X}(1) \\ S_{F_X}(1) \\ C_{F_X}(2) \\ S_{F_X}(2) \\ \square \end{bmatrix} =$$  Eq. 21

$$\begin{bmatrix} 0 & -2b \cdot S_{C,\theta}(0) \\ a^2 \cdot C_C(1) + 2b \cdot C_{C,\theta}(1) & b \cdot C_C(1) - 2b \cdot C_{C,\theta}(1) \\ b \cdot S_S(1) + 2b \cdot C_{S,\theta}(1) & -a^2 \cdot S_S(1) - 2bC_{S,\theta}(1) \\ 0 & -2b \cdot S_{C,\theta}(0) \\ 2b \cdot C_{S,\theta}(2) & 0 \\ \square & \square \end{bmatrix} \begin{bmatrix} U_{cos} \\ U_{sin} \end{bmatrix}$$

As shown in the equation 21, the cosine and sine terms have the linear relationship with the various order terms of the Fourier coefficients of the horizontal force. Therefore, it can be understood that the optimal cosine and sine components of the unbalanced mass are estimated from a single directional force. Also, the angle $\theta_0$ and the magnitude U of the unbalanced amount are calculated by the above-mentioned equation. In case that only the vertical force is measured, it is possible to estimate the optimal cosine and sine components of the unbalanced mass by the same method.

Method of Sampling Applied Force Signal and Method of Estimating Angular Velocity Coefficient If a rotary encoder is installed at a rotational shaft of the balancing apparatus, it is possible to obtain a constant angle signal upon every revolution of the shaft. In other words, it is possible to obtain N equi-angular pulse signals per revolution of the shaft, i.e., an angular position pulse having a constant width along a rotational angle. The angular position pulses are used as a synchronous pulse for sampling the applied force signals of the support at every desired angle. The method of sampling the signal at each of N equi-angles per revolution is called the equi-angle sampling method.

Hereinafter, there is introduced a method of estimating the angular velocity and the angular acceleration at every revolution of the rotational shaft using a reference position pulse generated whenever the rotary encoder is rotated once. Assuming that each revolution period before and after the reference position pulse which is indicated by "0" in FIG. 2 is respectively $T_{n-1}(T_{n-1}=N_{n-1} \cdot \Delta T)$ and $T_n(T_n=N_n \cdot \Delta T)$, an initial angular velocity $a_n$ and an angular acceleration $b_n$ can be expressed by the following equation.

$$a_n = \frac{2\pi}{\Delta T} \cdot \frac{N_{n-1}^2 + N_n^2}{N_{n-1} N_n \cdot (N_{n-1} + N_n)},$$

$$b_n = \frac{4\pi}{\Delta T^2} \cdot \frac{N_{n-1} - N_n}{N_{n-1} N_n \cdot (N_{n-1} + N_n)} \qquad \text{Eq. 22}$$

In the equation 22, $\Delta T$ indicates a period of a base clock used to measure a period of the reference position pulse, and mainly uses a frequency of 20 MHz or more. The initial angular velocity $a_n$ and the angular acceleration $b_n$ are respectively corresponding to the initial angular velocity a and the angular acceleration b in the linear time-varying angular velocity model.

If the rotary encoder is not used, the applied force signal of the support is sampled by a constant time sampling method which is employed in most of digital signal sampling methods. As shown in FIG. 3, the constant time sampling method uses a sampling pulse having a constant time width ($\Delta t$=constant). In case of sampling the applied force output signal to be measured with a constant time width, as shown in FIG. 3, it is substantially impossible to synchronize the reference position pulse and the sampling pulse. Therefore, the present invention proposes a method of calculating a measurement value at a reference point by measuring a time interval between the reference position pulse and the sampling pulse, and also calculating an angle between the reference point and a first sampling pulse.

In the lower right side of FIG. 3, a time interval $d_n \cdot \Delta t$ between an n-th reference position pulse and a sampling pulse is illustrated, and in the lower left side of FIG. 3, an equation model for calculating a measured force component $F_{X,0}$ corresponding to a time when the n-th reference position pulse is generated, using the interpolation principle, is provided. A time interval between the reference position pulse and the first sampling signal of every revolution is measured by a period measuring circuit of the reference position pulse as shown in FIG. 4.

In FIG. 4, $C_n$ and $D_n$ indicate a period of the reference pulse and a digital value used in measuring an observing time of a first sampling pulse after the reference pulse, respectively. The period of the reference position pulse and the time difference between the reference pulse and the first sampling pulse are calculated by the following equation:

$$T_n = (C_{n+1} - C_n) \cdot \Delta T = N_n \cdot \Delta T,$$

$$d_n \cdot \Delta t = (D_n - C_n) \cdot \Delta T \qquad \text{Eq. 23}$$

Using the initial angular velocity $a_n$ and the angular acceleration $b_n$ corresponding to the n-th revolution period and the time interval $d_n \cdot \Delta t$ between the n-th reference position pulse and the sampling signal, the rotational angle between the sampling pulses can be expressed as follows:

$$\Delta \theta_0 = \theta(d_n \cdot \Delta t),$$

$$\Delta \theta(m \cdot \Delta t) = \theta((m+1) \cdot \Delta t) - \theta(m \cdot \Delta t), m = 1, 2, \ldots, M_n - 1$$

$$\Delta \theta_{M_n} = 2\pi - \theta((d_n + M_n - 1) \cdot \Delta t). \qquad \text{Eq. 24}$$

In the equation 24, $M_n$ is the number of signals sampled during an n-th revolution period. By using the rotational difference between the sampling pulse, the cosine value of the Fourier coefficient of the horizontal force components measured at the support is calculated.

$$C_{F_X}(k) = \frac{1}{2\pi} \int_0^{2\pi} \cos(k \cdot \theta) \cdot F_X(\theta) d\theta \cong \frac{1}{2\pi} \cdot \qquad \text{Eq. 25}$$

$$\left\{ F_{X,0} \cdot \Delta \theta_0 + \sum_{m=1}^{M_n-1} F_X(m \cdot \Delta t) \cdot \Delta \theta(m \cdot \Delta t) + F_X(M_n \cdot \Delta t) \cdot \Delta \theta_0 \right\}$$

In the equation 25, $F_{X,0}$ is the horizontal force component corresponding to a time when the reference position pulse passes, and is calculated by using the interpolation principle as illustrated in the lower left side of FIG. 3. Of course, the cosine and sine values of the Fourier coefficients of the vertical force components as well as the sine value of the Fourier coefficients of the horizontal force components are estimated by the numerical integration method which is the same as the method of calculating the cosine value of the Fourier coefficients of the horizontal force components shown above. To reduce an error between a numerical integration value and a theoretical value, it is preferable that a sampling rate is established such that the number $M_n$ of the signals sampled during one revolution is at least 100 or more.

Balancing Using Vibration Measurement of Support

Until now, the method of directly measuring the applied forces on the support 30 to have the condition of a rigid body is described. If the supporting condition of the rotational shaft is minutely deformed or vibrated like a hard-spring having sufficient rigidity, the linear relationship is maintained between the force applied to the support and the vibration of the support. FIGS. 5A, 5B and 5C show three kinds of vibration models of the support, i.e., a horizontal vibration model, a vertical vibration model and a dual-axis vibration model.

The single direction models, i.e., the horizontal vibration model and the vertical vibration model are most widely used in the horizontal and vertical balancing apparatus, and the dual-axis vibration model is also used in the precision vertical balancing apparatus, i.e., a model which needs horizontal direction rigidity. As known in the field of vibration, the vibration acceleration and the force applied to the support have a linear proportion relationship, as follows.

$$F_X \approx m_{eff,X} \cdot a_X(t), F_Y \approx m_{eff,Y} \cdot a_Y(t) \qquad \text{Eq. 26}$$

In the equation 26, $m_{eff}$ indicates an effective mass of each measured shaft, and the effective mass is regarded as a proportional constant representing the linear relationship between the magnitude of the acceleration measured and the applied force to the practical test piece. This process is called the field balancing calibration using a known test mass and when the calibration is completed, the vibration acceleration component measured by a vibration sensor is readily used to evaluate the force applied to the support. Therefore, the methods of estimating the angular position and the magnitude of the unbalanced amount using the above-mentioned measured force are applied to the estimation of the angular position and the unbalanced amount of the rotational body using the Fourier coefficients of an output signal of the vibration sensor after the completion of the field balancing calibration. In other words, the method of estimating the angle and unbalanced amount, in which periodic rotational vibration is applied to the test piece and the single or dual axis vibration sensors are installed at the left and right (or upper and lower) support having the desired rigidity, is carried out along the same procedure as in the estimating method by directly measuring the applied forces.

Balancing Apparatus

FIG. 6 is a schematic view showing the configuration of a dynamic balancing apparatus using a linear time-varying angular velocity model in accordance with an embodiment of the present invention.

As described in FIG. 6, the dynamic balancing apparatus using a linear time-varying angular velocity model of the present invention includes a rotational shaft 10 on which a rotational body 1 having an unbalanced mass is installed; a linear time-varying angular velocity generator 20 which allow the rotational shaft 10 to be rotated at a linear time-varying angular velocity; a support 30 for supporting both sides of the rotational shaft 10; and a transducer 40 for measuring applied force or vibration transferred to the support 30 by revolution of the rotational shaft 10 having a linear time-varying angular velocity.

The rotational shaft 10 has the rotational body 1 having an unbalanced mass. The linear time-varying angular velocity generator 20 is installed at the rotational shaft 10 so that the rotational body 1 on the rotational shaft 10 is rotated at the linear time-varying angular velocity.

The linear time-varying angular velocity generator 20 functions to generate the rotational vibration due to the rotating unbalanced mass of the rotational body 1 so that the rotational shaft 10 is rotated at the linear time-varying angular velocity.

The support 30 supports the both sides of the rotational shaft 10. The rotational vibration generated by the linear time-varying angular velocity or the applied forces, i.e., centrifugal and tangential forces, are transferred to the support 30 by the revolution of the rotational shaft 10.

The transducer 40 is installed at the support 30 so as to measure the applied force or vibration transferred to the support 30 by the revolution or vibration of the rotational shaft 10. Thus, it is possible to estimate the angle and magnitude of the rotating unbalanced mass of the rotational body 1 using characteristic of the applied force or vibration measured by the transducer 40.

In addition, it is preferable that the present invention further includes a reference pulse generator 50 which generates a reference position pulse of the rotational shaft 10 so as to measure a position of the rotational body 1 with respect to the linear time-varying angular velocity of the rotational shaft 10.

Unlike the conventional balancing apparatus, the dynamic balancing apparatus using a linear time-varying angular velocity model uses the linear time-varying angular velocity generator 20 and a rotational vibration measuring sensor for measuring the amplitude of the periodic rotational vibration.

Angular motion controllers mainly allow a user to precisely control the linear time-varying angular velocity. Since high-speed motors like a brushless direct current (BLDC) motor or high-torque motors mainly provide a wide torque range of a few tens rpm to a few thousands rpm, these motors may be used as an apparatus for generating the linear angular motion. In case of using the reference pulse generator 50 or the rotary encoder which measures the reference position of the rotational shaft and the position of the rotational body at each constant angle, it is possible to sample the certain number of signals at every revolution with respect to the components of the horizontal or vertical force applied to the support using the equi-angle sampling method as described above. In case that the rotary encoder or the reference pulse generator 50 is not installed at the balancing apparatus, an apparatus for generating one reference position pulse upon every revolution is provided at the rotational shaft, and then the balancing is carried out using the constant time sampling method.

The apparatus for generating the linear angular velocity motion, the rotary encoder which is installed at the rotational shaft or, the apparatus for generating one reference position pulse may be additionally provided at the existing balancing apparatus so as to carry out the balancing. This means that the existing balancing apparatus can also perform the balancing method proposed in the present invention by appropriately applying the method of controlling the linear angular velocity motion with respect to time.

According to the present invention, it is possible to solve the problem that the conventional balancing apparatus performs the balancing only in the state that a motor is continuously rotated at a constant velocity. Therefore, since the present invention can perform the balancing even in the accelerating time until reaching a certain rotating speed from the stopped state and the decelerating time which is necessary to stop the rotating state from the certain rotating speed, it can be applied to an automatic balancing apparatus for a rapid production process. Thus, it is possible to remarkably reduce a balancing time in the automatic balancing apparatus for rapid production processes.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention of the appended claims.

The invention claimed is:

1. A dynamic balancing method using a linear time-varying angular velocity model, comprising:

rotating a rotational shaft, on which a rotational body having a rotating unbalanced mass is installed, at a linear time-varying angular velocity;

measuring vibration generated by tangential force, centrifugal force, or the two forces generated by the rotating unbalanced mass of the rotational body from the support which supports the rotational shaft rotated at the linear time-varying angular velocity;

estimating multiple frequency components of a measurement signal corresponding to the measured normal and centrifugal forces; and estimating the angular position, that is the angle, and the magnitude of the unbalanced mass of the rotational body using components of the measured tangential and centrifugal forces and characteristics of the frequency components (or Fourier coefficients) of the two forces, wherein the angular position and magnitude of the unbalanced mass of the rotational body is determined by the following equation:

$$\begin{aligned}F_X(\theta(t)) &= -F_t \cdot \sin(\theta(t)+\theta_0) + F_n \cdot \cos(\theta(t)+\theta_0)\\ &= mr \cdot b \cdot \sin(\theta(t)+\theta_0) + mr \cdot \{a^2 + 2b \cdot \theta(t)\} \cdot \cos(\theta(t)+\theta_0)\\ &= mr \cdot b \cdot \{\cos(\theta_0) \cdot \sin(\theta(t)) + \sin(\theta_0) \cdot \cos(\theta(t))\} +\\ &\quad mr \cdot a^2 \cdot \{\cos(\theta_0) \cdot \cos(\theta(t)) - \sin(\theta_0) \cdot \sin(\theta)\} +\\ &\quad mr \cdot 2b \cdot \{\cos(\theta_0) \cdot \theta(t) \cdot \cos(\theta(t)) - \sin(\theta_0) \cdot \theta(t) \cdot \sin(\theta(t))\}\end{aligned}$$

-continued $$F_Y(\theta(t)) = F_t \cdot \cos(\theta(t) + \theta_0) + F_n \cdot \sin(\theta(t) + \theta_0) -$$
$$= mr \cdot b \cdot \cos(\theta(t) + \theta_0) + mr \cdot \{a^2 + 2b \cdot \theta(t)\} \cdot \sin(\theta(t) + \theta_0) -$$
$$= mr \cdot b \cdot \{\cos(\theta_0) \cdot \cos(\theta(t) - \sin(\theta_0) \cdot \sin(\theta(t)\} +$$
$$mr \cdot a^2 \cdot \{\cos(\theta_0) \cdot \sin(\theta(t) + \sin(\theta_0) \cdot \cos(\theta(t)\} +$$
$$mr \cdot 2b \cdot \{\cos(\theta_0) \cdot \theta(t) \cdot \sin(\theta(t) + \sin(\theta_0) \cdot \theta(t) \cdot \cos(\theta(t)\}$$

wherein $F_x(t)$ is the horizontal component of each of the tangential force $F_t$ and the centrifugal force $F_n$ acting on the support by the rotating unbalanced mass of the rotational body; $F_y(t)$ is the vertical component of each of the tangential force $F_t$ and the centrifugal force $F_n$ generated acting on the support by the rotating unbalanced mass of the rotational body; m[kg] is the rotating unbalanced mass of the rotational body; r[m] is a distance of the rotating unbalanced mass of the rotational body, which is spaced apart from the center of rotational shaft; a[radians/s] is an initial rotational velocity; b[radians/s²] is a constant angular acceleration at the initial rotational velocity; $\theta(t)$ is an angular displacement of the rotational shaft; and $\theta_0$[radians] is an angular position from the rotation reference point of the rotational shaft wherein the angular position and magnitude of the unbalanced mass of the rotational body is determined by the following equation using the tangential and centrifugal forces, which are measured in the support and applied in the horizontal and vertical directions, $$\begin{bmatrix} C_{F_x}(k) \\ S_{F_x}(k) \\ C_{F_y}(k) \\ S_{F_y}(k) \end{bmatrix} = \begin{bmatrix} 0 & -2b \cdot S_{C,\theta}(0) \\ 2b \cdot C_{S,\theta}(k) & 0 \\ 2b \cdot S_{C,\theta}(2) & 0 \\ 0 & 2b \cdot C_{S,\theta}(k) \end{bmatrix} \begin{bmatrix} U_{cos} \\ U_{sin} \end{bmatrix},$$

for k = 1, 2, 3… wherein $C_{Fx}$ is the cosine component corresponding to Fourier coefficients of the horizontal component of the tangential force and the centrifugal force acting on the support by the rotating unbalanced mass of the rotational body, and $S_{Fx}$ is the sine component corresponding to Fourier coefficients of the horizontal component of the tangential and centrifugal forces acting on the support by the rotating unbalanced mass of the rotational body, and these components are determined by the following equation:

$$C_{F_X}(k) = \frac{1}{2\pi} \int_0^{2\pi} \cos(k \cdot \theta) \cdot F_X(\theta) d\theta,$$

$$S_{F_X}(k) = \frac{1}{2\pi} \int_0^{2\pi} \sin(k \cdot \theta) \cdot F_X(\theta) d\theta$$

and k is an integer indicating the order of Fourier coefficients, $C_{Fy}$ is the cosine component corresponding to Fourier coefficients of the vertical component of the tangential and centrifugal forces acting on the support by the rotating unbalanced mass of the rotational body, and $S_{Fy}$ is the sine component corresponding to Fourier coefficients of vertical components of the tangential and centrifugal forces acting on the support by the rotating unbalanced mass of the rotational body, and these components are determined by the following equation:

$$C_{F_y}(k) = \frac{1}{2\pi} \int_0^{2\pi} \cos(k \cdot \theta) \cdot F_Y(\theta) d\theta,$$

$$S_{F_y}(k) = \frac{1}{2\pi} \int_0^{2\pi} \sin(k \cdot \theta) \cdot F_Y(\theta) d\theta$$

and $U_{cos}$ is the cosine component of the unbalanced amount ($U_{cos}$=mr·cos($\theta_0$)) and $U_{sin}$ is the sine component of the unbalanced amount ($U_{sin}$=mr·sin($\theta_0$)), $$C_{c,\theta}(k) = \frac{1}{2\pi} \int_0^{2\pi} \cos(k \cdot \theta) \cdot \theta \cdot \cos(\theta) d\theta = \frac{\pi}{2}, \text{ only for } k = 1$$

$$S_{s,\theta}(k) = \frac{1}{2\pi} \int_0^{2\pi} \sin(k \cdot \theta) \cdot \theta \cdot \sin(\theta) d\theta = \frac{\pi}{2}, \text{ only for } k = 1$$

$$C_{s,\theta}(k) = \frac{1}{2\pi} \int_0^{2\pi} \sin(k \cdot \theta) \cdot \theta \cdot \cos(\theta) d\theta = \begin{cases} -1/4, & \text{for } k = 1 \\ -\frac{k}{k^2 - 1}, & \text{for } k = 2, 3, \ldots \end{cases}$$

$$S_{c,\theta}(k) = \frac{1}{2\pi} \int_0^{2\pi} \cos(k \cdot \theta) \cdot \theta \cdot \sin(\theta) d\theta = \begin{cases} 3k/4 - 1, & \text{for } k = 0, 1 \\ \frac{1}{k^2 - 1}, & \text{for } k = 2, 3, \ldots \end{cases}$$

wherein the angular position and magnitude of the unbalanced mass of the rotational body is determined by the following equation using the tangential and centrifugal forces applied in the horizontal direction, $$\begin{bmatrix} C_{F_x}(0) \\ C_{F_x}(1) \\ S_{F_x}(1) \\ C_{F_x}(2) \\ S_{F_x}(2) \\ \square \end{bmatrix} = \begin{bmatrix} 0 & -2b \cdot S_{C,\theta}(0) \\ a^2 \cdot C_c(1) + 2b \cdot C_{C,\theta}(1) & b \cdot C_C(1) - 2b \cdot C_{C,\theta}(1) \\ b \cdot S_S(1) + 2b \cdot C_{S,\theta}(1) & -a^2 \cdot S_S(1) - 2b C_{S,\theta}(1) \\ 0 & -2b \cdot S_{C,\theta}(2) \\ 2b \cdot C_{S,\theta}(2) & 0 \\ \square & \square \end{bmatrix} \begin{bmatrix} U_{cos} \\ U_{sin} \end{bmatrix}$$

wherein $C_{Fx}$ is the cosine component corresponding to Fourier coefficients of the horizontal component of the tangential and centrifugal forces acting on the support by the rotating unbalanced mass of the rotational body, and $S_{Fx}$ is the sine component corresponding to Fourier coefficients of the horizontal component of the tangential and centrifugal forces acting on the support by the rotating unbalanced mass of the rotational body, and these components are determined by the following equation:

$$C_{F_x}(k) = \frac{1}{2\pi} \int_0^{2\pi} \cos(k \cdot \theta) \cdot F_X(\theta) d\theta,$$

$$S_{F_x}(k) = \frac{1}{2\pi} \int_0^{2\pi} \sin(k \cdot \theta) \cdot F_X(\theta) d\theta$$

and k is an integer indicating the order of the Fourier coefficient, $U_{cos}$ is the cosine component of the unbalanced amount ($U_{cos}$=mr·cos($\theta_0$)) and $U_{sin}$ is the sine component of the unbalanced amount ($U_{sin}$=mr·sin($\theta_0$)), and $$C_{c,\theta}(k) = \frac{1}{2\pi}\int_0^{2\pi} \cos(k\cdot\theta)\cdot\theta\cdot\cos(\theta)d\theta = \frac{\pi}{2}, \quad \text{only for } k = 1$$

$$S_{s,\theta}(k) = \frac{1}{2\pi}\int_0^{2\pi} \sin(k\cdot\theta)\cdot\theta\cdot\sin(\theta)d\theta = \frac{\pi}{2}, \quad \text{only for } k = 1$$

$$C_{s,\theta}(k) = \frac{1}{2\pi}\int_0^{2\pi} \sin(k\cdot\theta)\cdot\theta\cdot\cos(\theta)d\theta = \begin{cases} -1/4, & \text{for } k = 1 \\ -\frac{k}{k^2-1}, & \text{for } k = 2, 3, \ldots \end{cases}$$

$$S_{c,\theta}(k) = \frac{1}{2\pi}\int_0^{2\pi} \cos(k\cdot\theta)\cdot\theta\cdot\sin(\theta)d\theta = \begin{cases} 3k/4 - 1, & \text{for } k = 0, 1 \\ \frac{1}{k^2-1}, & \text{for } k = 2, 3, \ldots \end{cases}$$

wherein a measurement signal sampling method exploits a sampling pulse having a constant time width ($\Delta t$=constant) and then measures applied force signals of the support using the following equation:

$$T_n = (C_{n+1} - C_n)\cdot\Delta T = N_n\cdot\Delta T,$$

$$d_n\cdot\Delta t = (D_n - C_n)\cdot\Delta T$$

wherein $C_n$ and $D_n$ are a period of the reference pulse and a digital value used in measuring an observing time of a first sampling pulse after the reference pulse, $\Delta T$ is a period of a base clock used in measuring a period of the reference position pulse, $T_n$ is n-th revolution period, and $d_n$ is a fractional part of a sampling period, $d_n$ is a fractional part of a sampling period, and $d_n\cdot\Delta t$ is a time interval between an n-th reference position pulse and a sampling pulse, and $$\Delta\theta_0 = \theta(d_n\cdot\Delta t),$$

$$\Delta\theta(m\cdot\Delta t) = \theta((m+1)\cdot\Delta t) - \theta(m\cdot\Delta t), m = 1, 2, \ldots, M_n - 1$$

$$\Delta\theta_{M_n} = 2\pi - \theta((d_n + M_n - 1)\cdot\Delta t)$$

$M_n$ is the number of signals sampled during one revolution, and $$C_{F_x}(k) =$$

$$\frac{1}{2\pi}\int_0^{2\pi} \cos(k\cdot\theta)\cdot F_X(\theta)d\theta \cong \frac{1}{2\pi}\cdot\left\{F_{X,0}\cdot\Delta\theta_0 + \sum_{m=1}^{M_n-1} F_X(m\cdot\Delta t)\cdot\Delta\theta(m\cdot\Delta t) + F_X(M_n\cdot\Delta t)\cdot\Delta\theta_0\right\}$$

$C_{Fx}(k)$ is the cosine value of Fourier coefficients of the component of the horizontal force measured in the support.

2. The dynamic balancing method of claim 1, wherein the angular position and magnitude of the unbalanced mass of the rotational body is determined by the following equation using the tangential force and the centrifugal force acting on support in the horizontal and vertical directions, $$\begin{bmatrix} C_{F_X}(0) \\ C_{F_Y}(0) \\ C_{F_X}(1) \\ S_{F_X}(1) \\ C_{F_Y}(1) \\ S_{F_Y}(1) \\ C_{F_X}(2) \\ S_{F_X}(2) \\ C_{F_Y}(2) \\ S_{F_Y}(1) \\ \square \\ \square \end{bmatrix} = \begin{bmatrix} 0 & -2b\cdot S_{C,\theta}(0) \\ +2b\cdot S_{C,\theta}(0) & 0 \\ a^2\cdot C_C(1) + 2b\cdot C_{C,\theta}(1) & b\cdot C_C(1) - 2b\cdot S_{C,\theta}(1) \\ b\cdot S_S(1) + 2b\cdot C_{S,\theta}(1) & -a^2\cdot S_S(1) - 2b\cdot S_{S,\theta}(1) \\ -b\cdot C_C(1) + 2b\cdot S_{C,\theta}(1) & a^2\cdot C_C(1) + 2b\cdot C_{C,\theta}(1) \\ a^2\cdot S_S(1) + 2b\cdot S_{S,\theta}(1) & b\cdot S_S(1) + 2b\cdot C_{S,\theta}(1) \\ 0 & -2b\cdot S_{C,\theta}(2) \\ 2b\cdot C_{S,\theta}(2) & 0 \\ 2b\cdot S_{S,\theta}(2) & 0 \\ 0 & 2b\cdot C_{S,\theta}() \\ \square & \square \\ \square & \square \end{bmatrix} \begin{bmatrix} U_{cos} \\ U_{sin} \end{bmatrix}$$

wherein $C_{FX}$ is the cosine component corresponding to Fourier coefficients of the horizontal component of the tangential force and the centrifugal force acting on the support by the rotating unbalanced mass of the rotational body, and $S_{Fx}$ is the sine component corresponding to Fourier coefficients of the horizontal component of the tangential and centrifugal forces generated at the support by the rotating unbalanced mass of the rotational body, and these components are determined by the following equation:

$$C_{F_x}(k) = \frac{1}{2\pi}\int_0^{2\pi} \cos(k\cdot\theta)\cdot F_X(\theta)d\theta,$$

$$S_{F_x}(k) = \frac{1}{2\pi}\int_0^{2\pi} \sin(k\cdot\theta)\cdot F_X(\theta)d\theta$$

and k is an integer indicating the order of Fourier coefficients, $C_{Fy}$ is the cosine component corresponding to Fourier coefficients of the vertical component of the tangential and centrifugal forces acting on the support by the rotating unbalanced mass of the rotational body, and $S_{Fy}$ is the sine component corresponding to Fourier coefficients of the vertical component of the tangential and centrifugal forces acting on the support by the rotating unbalanced mass of the rotational body, and these components are determined by the following equation:

$$C_{F_y}(k) = \frac{1}{2\pi}\int_0^{2\pi} \cos(k\cdot\theta)\cdot F_Y(\theta)d\theta,$$

$$S_{F_y}(k) = \frac{1}{2\pi}\int_0^{2\pi} \sin(k\cdot\theta)\cdot F_Y(\theta)d\theta$$

and $U_{cos}$ is the cosine component of the unbalanced amount ($U_{cos}$=mr·cos($\theta_0$)) and $U_{sin}$ is the sine component of the unbalanced amount ($U_{sin}$=mr·sin($\theta_0$)), and $$C_{c,\theta}(k) = \frac{1}{2\pi}\int_0^{2\pi} \cos(k\cdot\theta)\cdot\theta\cdot\cos(\theta)d\theta = \frac{\pi}{2}, \quad \text{only for } k = 1$$

$$S_{s,\theta}(k) = \frac{1}{2\pi}\int_0^{2\pi} \sin(k\cdot\theta)\cdot\theta\cdot\sin(\theta)d\theta = \frac{\pi}{2}, \quad \text{only for } k = 1$$

$$C_{s,\theta}(k) = \frac{1}{2\pi}\int_0^{2\pi} \sin(k\cdot\theta)\cdot\theta\cdot\cos(\theta)d\theta = \begin{cases} -1/4, & \text{for } k = 1 \\ -\frac{k}{k^2-1}, & \text{for } k = 2, 3, \ldots \end{cases}$$

-continued $$S_{c,\theta}(k) = \frac{1}{2\pi} \int_0^{2\pi} \cos(k \cdot \theta) \cdot \theta \cdot \sin(\theta) d\theta = \begin{cases} 3k/4 - 1, & \text{for } k = 0, 1 \\ \frac{1}{k^2 - 1}, & \text{for } k = 2, 3, \ldots \end{cases}$$

3. The dynamic balancing method of claim 1, wherein the angular position and magnitude of the unbalanced mass of the rotational body is determined by the following equation using the tangential force and the centrifugal force applied in the vertical direction, $$\begin{bmatrix} C_{F_y}(0) \\ C_{F_y}(1) \\ S_{F_y}(1) \\ C_{F_y}(2) \\ S_{F_y}(1) \\ \cdot \\ \cdot \\ \cdot \end{bmatrix} = \begin{bmatrix} +2b \cdot S_{C,\theta}(0) & 0 \\ -b \cdot C_C(1) + 2b \cdot S_{C,\theta}(1) & a^2 \cdot C_C(1) + 2b \cdot C_{C,\theta}(1) \\ a^2 \cdot S_S(1) + 2b \cdot S_{S,\theta}(1) & b \cdot S_S(1) + 2b \cdot C_{S,\theta}(1) \\ 2b \cdot S_{S,\theta}(2) & 0 \\ 0 & 2b \cdot C_{S,\theta}(2) \\ \cdot & \cdot \\ \cdot & \cdot \\ \cdot & \cdot \end{bmatrix} \begin{bmatrix} U_{cos} \\ U_{sin} \end{bmatrix}$$

wherein $C_{F_y}$ is the cosine component corresponding to Fourier coefficients of the vertical component of the tangential and centrifugal forces acting on the support by the rotating unbalanced mass of the rotational body, and $S_{F_y}$ is the sine component corresponding to Fourier coefficients of the vertical component of the tangential and centrifugal forces acting on the support by the rotating unbalanced mass of the rotational body, and these components are determined by the following equation:

$$C_{F_y}(k) = \frac{1}{2\pi} \int_0^{2\pi} \cos(k \cdot \theta) \cdot F_Y(\theta) d\theta,$$

$$S_{F_y}(k) = \frac{1}{2\pi} \int_0^{2\pi} \sin(k \cdot \theta) \cdot F_Y(\theta) d\theta$$

and k is an integer indicating the order of the Fourier coefficient, and $U_{cos}$ is the cosine component of the unbalanced amount ($U_{cos}$=mr·cos($\theta_0$)) and $U_{sin}$ is the sine component of the unbalanced amount ($U_{sin}$=mr·sin($\theta_0$)), and $$C_{c,\theta}(k) = \frac{1}{2\pi} \int_0^{2\pi} \cos(k \cdot \theta) \cdot \theta \cdot \cos(\theta) d\theta = \frac{\pi}{2}, \quad \text{only for } k = 1$$

$$S_{s,\theta}(k) = \frac{1}{2\pi} \int_0^{2\pi} \sin(k \cdot \theta) \cdot \theta \cdot \sin(\theta) d\theta = \frac{\pi}{2}, \quad \text{only for } k = 1$$

$$C_{s,\theta}(k) = \frac{1}{2\pi} \int_0^{2\pi} \sin(k \cdot \theta) \cdot \theta \cdot \cos(\theta) d\theta = \begin{cases} -1/4, & \text{for } k = 1 \\ -\frac{k}{k^2 - 1}, & \text{for } k = 2, 3, \ldots \end{cases}$$

$$S_{c,\theta}(k) = \frac{1}{2\pi} \int_0^{2\pi} \cos(k \cdot \theta) \cdot \theta \cdot \sin(\theta) d\theta = \begin{cases} 3k/4 - 1, & \text{for } k = 0, 1 \\ \frac{1}{k^2 - 1}, & \text{for } k = 2, 3, \ldots \end{cases}$$

4. The dynamic balancing method of claim 1, wherein a measurement signal sampling method is used to sample force signals applied to the support using a reference pulse generator or a rotary encoder which generates equi-angle position pulses having a constant angular revolution using a reference position pulse generated whenever the rotational shaft is rotated once.

5. The dynamic balancing method of claim 4, wherein an angular velocity and an angular acceleration corresponding to a revolution period when generating N equi-angular pulses per revolution are determined by the following equation:

$$a_n = \frac{2\pi}{\Delta T} \cdot \frac{N_{n-1}^2 + N_n^2}{N_{n-1} N_n \cdot (N_{n-1} + N_n)},$$

$$b_n = \frac{4\pi}{\Delta T^2} \cdot \frac{N_{n-1} - N_n}{N_{n-1} N_n \cdot (N_{n-1} + N_n)}$$

wherein $a_n$ is an angular velocity corresponding to the revolution period $T_n$ of the rotational shaft, $b_n$ is an angular acceleration corresponding to the revolution period $T_n$ of the rotational shaft, $\Delta T$ is a period of a base clock used in measuring a period of the reference position pulse, $N_{n-1}$ is the number of equi-angular pulse signals corresponding to a revolution period $T_{n-1}(T_{n-1}=N_{n-1}\cdot\Delta T)$ before the reference position pulse, and $N_n$ is the number of equi-angle pulses each revolution period $T_n(T_n=N_n\cdot\Delta T)$ after the reference position pulse.

6. The dynamic balancing method of claim 1, wherein horizontal and vertical components of the tangential and centrifugal forces acting on the support by the rotating unbalanced mass of the rotational body using vibration acceleration measured from a vibration sensor is determined by the following equation:

$$F_X \approx m_{eff,X} \cdot a_X(t), F_Y \approx m_{eff,Y} \cdot a_Y(t)$$

$m_{eff}$ is an effective mass of a rotational body, and $a_x(t)$ and $a_y(t)$ are the measured vibration acceleration signals that satisfy a linear relationship between the measured vibration accelerations and the tangential and centrifugal forces acting on the support and the measured vibration acceleration signals from the support are used to determine the angular position and magnitude of an unbalanced mass, by installing vibration transducers in the horizontal and/or vertical movement directions of the support, and Fourier coefficients of the horizontal and vertical force components, are evaluated for implementing vibration measurement-based dynamic balancing.

7. The dynamic balancing method of claim 3, wherein a measurement signal sampling method is used to sample force signals applied to the support using a reference pulse generator or a rotary encoder which generates equi-angle position pulses having a constant angular revolution using a reference position pulse generated whenever the rotational shaft is rotated once.

8. The dynamic balancing method of claim 3, wherein a measurement signal sampling method exploits a sampling pulse having a constant time width ($\Delta t$=constant) and then measures applied force signals of the support using the following equation:

$$T_n = (C_{n+1} - C_n) \cdot \Delta T = N_n \cdot \Delta T,$$

$$d_n \cdot \Delta t = (D_n - C_n) \cdot \Delta T$$

wherein $C_n$ and $D_n$ are a period of the reference pulse and a digital value used in measuring an observing time of a first sampling pulse after the reference pulse, $\Delta T$ is a period of a base clock used in measuring a period of the reference position pulse, $T_n$ is n-th revolution period, and $d_n$ is a fractional part of a sampling period, and $$\Delta\theta = \theta(d_n \cdot \Delta t),$$

$$\Delta\theta = (m \cdot \Delta t) = \theta((m+1) \cdot \Delta t) - \theta(m \cdot \Delta t), m=1, 2, \ldots M_n-1$$

$$\Delta\theta_{M_n} = 2\pi - \theta((d_n + M_n - 1) \cdot \Delta t),$$

$M_n$ is the number of signals sampled during one revolution, and $$C_{F_x}(k) = \frac{1}{2\pi}\int_0^{2\pi} \cos(k \cdot \theta) \cdot F_X(\theta) d\theta \cong \frac{1}{2\pi} \cdot \left\{ \begin{array}{l} F_{X,0} \cdot \Delta\theta_0 + \sum_{m=1}^{M_n-1} F_X(m \cdot \Delta t) \cdot \\ \Delta\theta(m \cdot \Delta t) + F_X(M_n \cdot \Delta t) \cdot \Delta\theta_0 \end{array} \right\}$$

$C_{Fx}(k)$ is the cosine value of Fourier coefficients of the component of the horizontal force measured in the support.

* * * * *